March 15, 1949. J. F. SEBALD 2,464,617
WATER TREATING APPARATUS
Filed Feb. 13, 1947 3 Sheets-Sheet 1

Inventor
Joseph F. Sebald
By [signature]
Attorney

March 15, 1949. J. F. SEBALD 2,464,617
WATER TREATING APPARATUS
Filed Feb. 13, 1947 3 Sheets-Sheet 2

Inventor
Joseph F. Sebald
By Robt Meyer
Attorney

March 15, 1949. J. F. SEBALD 2,464,617
WATER TREATING APPARATUS
Filed Feb. 13, 1947. 3 Sheets-Sheet 3

Joseph F. Sebald
INVENTOR.

BY
ATTORNEY

Patented Mar. 15, 1949

2,464,617

UNITED STATES PATENT OFFICE 2,464,617

WATER TREATING APPARATUS

Joseph F. Sebald, Bloomfield, N. J., assignor to Worthington Pump and Machinery Corporation, Harrison, N. J., a corporation of Delaware Application February 13, 1947, Serial No. 728,216

17 Claims. (Cl. 210—16)

This invention relates to water treating apparatus and more particularly to an improved cold process apparatus for softening, clarifying and purifying water.

The present invention embodies the advantages of the known fact that to add raw water and chemicals to a slurry containing previously precipitated particles improves and accelerates coagulation and purification and accelerates the chemical and physical changes involved in separating out the formed substances or solids. The newly formed solids deposit by accretion upon the particles present in the slurry rather than separating out as new small particles. These particles are relatively stable, being not readily subject to disintegration, and of such nature that clear treated water is readily separated from the slurry.

An object of the present invention is to provide an improved apparatus operating on the principles above outlined which thoroughly mixes raw water, chemicals, and slurry by means of a novel type of impeller structure so as to rapidly and effectively precipitate foreign material from the water.

Another object of the invention is to provide in an apparatus of the type specified means whereby the amount of recirculation of partially treated water, chemicals, and precipitated particles, may be varied so as to adapt the apparatus to variations in the composition of raw water being treated without loss of efficiency.

Another object of the invention is to incorporate in an apparatus of the type specified, stationary means utilizing the velocity of the effluent to impart a rotary motion to the effluent rising through the settling chamber to increase the length of passage and duration of settling action therein.

Another object is to embody in an apparatus of the type described features providing substantially constant flow of water through the apparatus, controlled concentration of slurry, and removal of sludge accumulations from the bottom of the water treating receptacle.

With these and other objects in view as may appear from the accompanying specification, the invention consists of various features of construction and combination of parts, which will be first described in connection with the accompanying drawings, showing a water treating apparatus of the preferred form embodying the invention, and the features forming the invention will be specifically pointed out in the claims.

Figure 1:
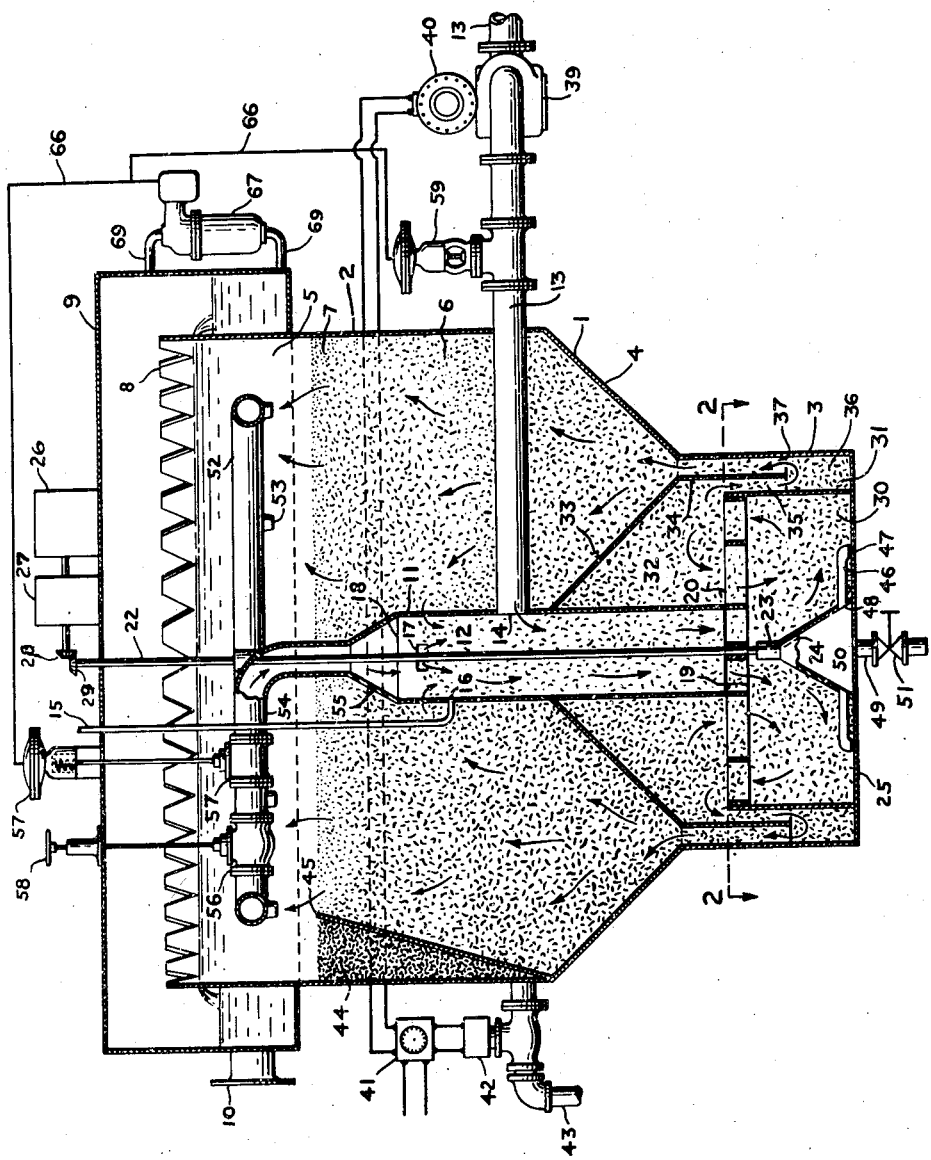
Figure 1 is a vertical section through the improved water treating apparatus.

Referring more particularly to the drawings, the improved water treating apparatus includes a main body or treating receptacle 1 which is formed of an upper cylindrical wall 2 and a lower cylindrical wall 3 joined by an inwardly and downwardly tapering annular wall 4. The upper portion of receptacle 1 has a treated water collection zone 5 beneath which is the sedimentation or settling zone 6. The floc bed 7 is formed at the top of the settling zone 6. The treated water rising through settling zone 6 passes through the floc bed 7 and accumulates in collection zone 5 from which it passes over the top serrated edge 8 of the receptacle 1 into the annular treated water storage compartment 9. The storage compartment 9 has an outlet 10 through which treated water is drawn for use as desired.

Centrally located and suitably supported within the receptacle 1 is a cylinder 11 forming the mixing chamber 12. Raw water to be treated is delivered from its source (not shown) through the inlet pipe 13 to the raw water inlet 14 of the mixing chamber 12. Chemicals for precipitating the hardness imparting constituents from the raw water are delivered from their source (not shown) through a suitable inlet pipe 15 to the chemical inlet 16 of the mixing chamber 12. Circumferentially spaced about the cylindrical wall 11 of the mixing chamber 12 are a plurality of slurry admitting openings 17 through which a predetermined amount of slurry passes from the settling zone 6 for mixture with the chemicals and water in the mixing chamber 12. The slurry, containing previously precipitated particles, provides nuclei for the formation of solids resulting from the reaction of the chemicals and the hardness imparting constituents of the water, thereby facilitating precipitation and hastening the treating process.

The upper end of the mixing chamber 12 has an inlet 18 for the recirculation of treated water therein, to be hereinafter described, and the lower end has an outlet 19 for the effluent contained therein. The first pumping section 20a of the impeller structure 20 is located at the outlet 19 and pumps the effluent from the mixing chamber 12. The action of the pumping section 20a together with that of the incoming water, chemicals, and slurry create a state of agitation in mixing chamber 12 and effluent passing through outlet 19 is a rather uniform mixture of water, chemicals, and precipitated particles of foreign material.

Figure 2:
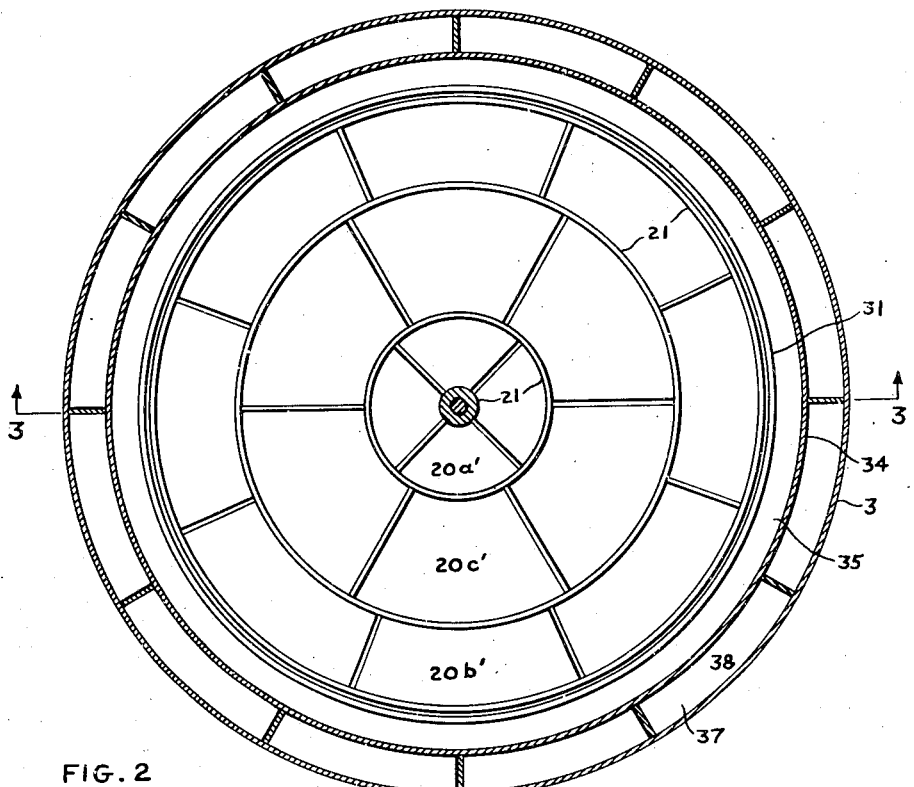
Figure 2 is a horizontal section taken on the line 2—2 of Figure 1.
Figure 3:
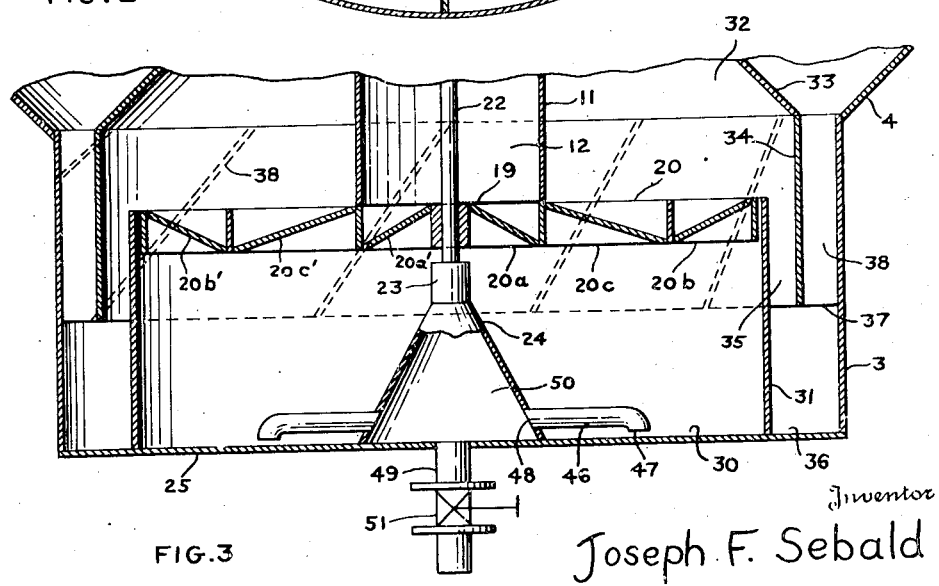
Figure 3 is a vertical section taken on the line 3—3 of Figure 2.

The impeller structure 20, as shown in its preferred form in Figures 2 and 3, has three annular pumping sections each consisting of a plurality of vanes rigidly assembled or integrally cast with the shroud rings 21. The vanes 20a' carried by the inner pumping section 20a and the vanes 20c' carried by the intermediate pumping section 20c produce flow in a downward direction and their combined output equals the maximum output of the softener and is less than the output of the outer pumping section 20b carrying vanes 20b' producing flow in an upward direction. The impeller structure is rigidly fixed by suitable means (not shown) familiar to those skilled in the art to the drive shaft 22, the lower end of which is carried by thrust bearing 23 mounted on the hollow bearing mounting 24 fixed to the bottom 25 of the receptacle 1. The drive shaft 22 extends upwardly through mixing chamber 12 to the exterior of the tank. Suitable means are provided for rotating shaft 22 at variable speeds, such as the motor 26 acting through the variable speed transmission 27 to drive bevel gear 28 engaging bevel gear 29 fixed on the upper end of shaft 22. The driving means may be supported as indicated on the top of storage compartment 9 or by other suitable structure (not shown).

Upon rotation of the impeller structure 20, effluent is pumped by section 20a from the mixing chamber 12 downwardly into the first recirculation chamber 30. The first recirculation chamber 30 is formed by the bottom 25 of the receptacle 1 and the vertical cylindrical wall 31 fixed thereto. The wall 31 is of slightly larger diameter than the impeller structure 20 and extends upwardly to substantially the horizontal plane in which the lower end of the mixing chamber 12 lies. The effluent in first recirculation chamber 30 flows outwardly to the inlet of outer pumping section 20b which pumps it upwardly into the second recirculation chamber 32.

The second recirculation chamber 32 is formed by the cylindrical wall 11 of the mixing chamber 12 encircled by the upper end of an outwardly and downwardly tapering annular wall 33 joined at its lower end by a vertical downwardly extending cylindrical wall 34. The cylindrical wall 34 is of larger diameter than cylindrical wall 31 and forms therewith an annular outlet passage 35 from the second recirculation chamber 32 opening into the annular space 36 formed by the bottom 25 of the receptacle 1, vertical cylindrical wall 31, and the lower cylindrical wall 3 of the receptacle 1. An annular passage 37 formed by vertical cylindrical wall 34 and lower cylindrical wall 3 of the receptacle 1 permits flow of effluent from the annular space 36 into the annular trough-like bottom portion, formed by the cooperating tapering walls 4 and 33, of the settling zone 6.

The upwardly pumping section 20b is designed to have a greater capacity than the downwardly pumping section 20c and therefore the amount of effluent pumped by section 20b into the second recirculation chamber 32 exceeds the capacity of section 20c. The excess effluent is forced out through the annular outlet passage 35 and the remainder is pumped by section 20c downwardly back into the first recirculation chamber 30. The impeller structure is designed so that the amount of effluent recirculated by the section 20c is several times greater than that forced through outlet 35 of the settling zone 6 or that pumped by section 20a from the mixing chamber 12 into the first recirculation chamber 30. Such recirculation of the effluent consisting of partially treated water, chemicals, and previously precipitated particles, provides thorough and intimate mixing of the constituents of the effluent and increased opportunity for the precipitation and growth of the particles of foreign material separated from the water being treated by the action of the chemicals.

The optimum amount of recirculation per unit interval of time, or rate of recirculation, may vary with the composition of the water being treated. It is therefore desirable in an apparatus of this type to be able to control the rate of recirculation so as to most efficiently treat water having varying types and degrees of hardness. Provision is made in this apparatus for controlling the rate of recirculation as will be presently described.

The output of the inner pumping section 20a is governed by the volume of effluent available in the mixing chamber 12 and the vanes 20a' are designed so that the section 20a has a tendency to operate at more than full capacity at all speeds of rotation. Because of this, as well as a treated water recirculation feature to be hereinafter described, the rate of flow through the mixing chamber 12 may be controlled by regulating valves so as to be substantially constant regardless of rotational speed. Thus the outputs of pumping sections 20b and 20c are governed by the design of their vanes and by the speed of rotation of the impeller structure 20. For a given speed of rotation, the rate of recirculation between recirculation chambers 30 and 32 depends upon the design of the respective vanes 20b' and 20c'; and for given vane designs, the rate of this recirculation may be varied by varying the speed of rotation of the impeller structure 20.

In the installation of the improved water treating apparatus the impeller structure is designed to give an optimum rate of recirculation, at a predetermined speed, for the type of water to be treated and the chemicals employed. Subsequent operation or variations in the composition of the water being treated may necessitate changes in the degree of mixing or rate of recirculation to obtain the most efficient operation of the apparatus. As indicated this can be readily achieved by varying the speed of rotation by means of the variable speed transmission 27. It is to be understood that other variable speed means for driving the impeller structure 20 may be employed without departing from the spirit of the invention.

The effluent forced out of second recirculation chamber 32 flows downwardly through the annular passage 35 into the annular space 36 wherein its direction of flow is completely reversed and it flows upwardly through the annular passage 37. The annular passage 37 contains a plurality of fixed flow directing vanes 38 which transform the vertical velocity of the effluent into a large horizontal velocity component and a smaller vertical component thus, in effect, producing an upward spiral rotation of the effluent as it enters the settling zone 6. Reduction of the vertical velocity of the effluent eliminates excessive localized agitation of the floc bed 7 and the spiral path followed by the effluent rising through the settling zone 6 provides it with maximum length of travel and opportunity for the agglomeration and separation of precipitated particles. The floc bed 7 serves to filter out the foreign material in suspension in the water and clarified, treated water rises therefrom into the collection zone 5 from whence it flows into the storage compartment 9, as previously described.

It is desirable to maintain the level of the floc bed substantially constant and prevent the excessive deposition of precipitated particles on the inner surfaces of the apparatus. Since the level of the floc bed and the suspension of particles represents an equilibrium between the natural gravitational forces acting downwardly on the particles and the upward force of the water rising through the apparatus, it is essential that these forces be kept substantially in balance. This can be accomplished by recirculating treated water through the apparatus so as to maintain uniform flow regardless of demand and by removing sludge or precipitated particles in sufficient quantities so as to maintain the desired concentration of solids in suspension substantially constant.

The automatic sludge removal device employed in the improved water treating apparatus is specifically described in Patent No. 2,355,561, of August 8, 1944, and forms no part of the present invention. It consists of a water meter 39 having a switch mechanism 40 operatively connected thereto. The switch mechanism 40 is electrically connected to a time delay relay 41 which is also connected to an electrical source. The time delay relay is electrically connected to the solenoid operated valve 42 in the sludge outlet line 43. A sludge collection trough 44 is formed on the inner wall of the receptacle 1 by a suitable partition 45 attached thereto and is positioned to receive precipitated particles from the floc bed 7 or the settling zone 6. The sludge trough empties at its bottom portion into the sludge outlet line 43. Flow of raw water through the meter 39 actuates the switch mechanism 40 which acting through the time delay relay 41 opens the solenoid valve 42 permitting blow off of sludge through the outlet line 43 for a period depending upon the setting of the time delay relay 41. Thus, the sludge removal is governed in accordance with the rate of particle formation by the rate of raw water flowing into the apparatus.

An auxiliary sludge removal device is also provided for removing foreign material which accumulates on the bottom 25 of the receptacle 1 in the first recirculation chamber 30. A plurality of radially extending pipes 46 having downwardly disposed inlets 47 positioned near the bottom 25 of the receptacle 1 are carried by the hollow bearing mount 24 and have outlets 48 opening thereinto. A sludge outlet line 49 communicates with the interior 50 of the hollow bearing mounting 24. Opening the valve 51 in the sludge outlet line 49 permits sludge from the bottom 25 of the receptacle 1 to be forced through pipes 46 into the interior 50 of the bearing mounting 24 from which it flows to waste through outlet pipe 49.

Figures 4, 5:
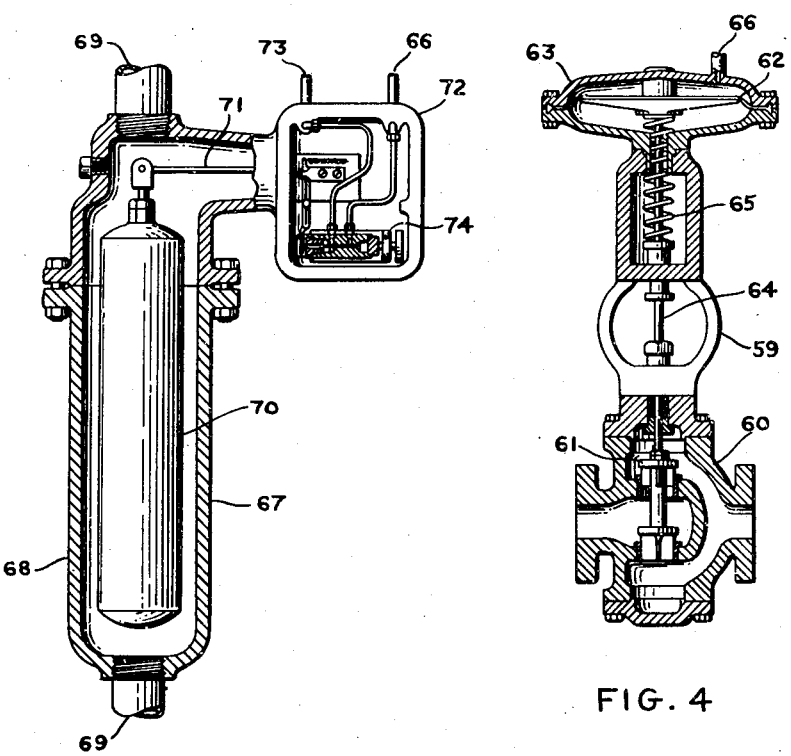
Figure 4 is a detailed longitudinal section of the pressure actuated valve.
Figure 5 is a detailed longitudinal section of the float level control device.

The recirculation of treated water feature includes an annular treated water intake manifold 52 having a plurality of circumferentially spaced inlets 53 opening into the collection zone 5. A radially extending manifold outlet line 54 in the treated water collection zone 5 is connected by means of truncated conical section 55 to the cylindrical wall 11 at the treated water inlet 18 of the mixing chamber 12. The manifold outlet line 54 carries two valves, manually operated valve 56 and pressure actuated valve 57. The manually operated valve 56 is of a standard type such as may be purchased on the open market and is actuated by manual operation of the handle 58 which is exterior of the water treating apparatus. Manual valve 56 is used in conjunction with speed change device 27 so as to compensate for changes in pressure when the speed of rotation of the impeller structure 20 is varied. Pressure actuated valve 57, which is schematically illustrated exterior of the treating apparatus for the purpose of clarity, is similar to pressure actuated valve 59 in the raw water inlet line 13, but reversely actuated. The pressure actuated valves 57 and 59 are of a standard type and may be purchased on the open market. Figure 4 shows one such valve. It consists of a main body or housing 60 having a double-seated valve spool 61 positioned therein to control the flow of water through the housing 60 and consequently through the pipe 13. The valve spool 61 is connected to the diaphragm 62, located in the sealed housing 63, by means of the valve stem 64. The diaphragm 62 is urged to the valve open position by the spring 65 but the pressure of air entering the housing 63 through line 66 urges the diaphragm 62 to the valve close position. The flow of air through line 66 is controlled by the float level control device 67 which is also a standard unit which may be purchased on the open market. Figure 5 illustrates a float level control device 67. The device 67 includes a housing 68 connected by means of piping 69 to the interior of the treated water storage compartment 9 so that water may flow from compartment 9 into the housing 68 and actuate the float 70 carried therein. The float 70 is connected by a suitable lever 71 to the pilot actuating mechanism 72. Air from a source not shown is admitted to the mechanism 72 through inlet line 73 and its passage through the mechanism 72 to outlet line 66 is regulated by pilot valve 74 which is operatively connected to the lever 71. Thus, the air flowing out through line 66 is effectively controlled by variations in the level of treated water in compartment 9 through the vertical movement of float 70 and tends to close the valve 59 in the raw water line 13 as the level of water rises in storage compartment 9. Air flowing through line 66 also actuates the pressure actuated valve 57 but reversely to the actuation of valve 59 so that the flow of treated water through the recirculation manifold outlet line 54 will be complementary to the flow through raw water inlet line 13 and substantially a constant predetermined quantity of water will flow through the apparatus regardless of the demand for treated water.

It is to be understood that the specific structure and arrangement of parts enclosed may be widely modified within the spirit of the invention defined by the claims.

What is claimed is:

1. In a water treating apparatus, a receptacle, the upper portion of said receptacle comprising a treated water collection zone and the portion beneath said upper portion including a settling zone wherein foreign material is precipitated from the water; said receptacle having an outlet for treated water communicating with said treated water collection zone; partitions within said receptacle forming a mixing chamber, first and second recirculation chambers, and communicating means for the flow of effluent from said mixing chamber through said first and second recirculation chambers to said settling zone; means for admitting raw water to said mixing chamber; means for admitting chemicals to said mixing chamber; means for admitting slurry to said mixing chamber; an impeller structure having first, second, and third pumping sections; each of said pumping sections being of annular form and having a plurality of flow directing vanes; said pumping sections being concentrically disposed about and driven by a common driving shaft; said pumping sections acting in substantially the same plane; said first and third pumping sections producing flow of the effluent in a direction substantially reverse to the direction of flow produced by said second pumping section; said first pumping section having its inlet positioned at the outlet of said mixing chamber to receive therefrom effluent comprising water, chemicals, and slurry, said first pumping section discharging effluent into said first recirculation chamber; said second pumping section having its inlet positioned to receive effluent from said first recirculation chamber and its outlet positioned for discharging effluent into said second recirculation chamber, means for guiding part of the discharge from said second pumping section into said settling zone; said third pumping section having its inlet positioned to receive effluent from said second recirculation chamber and its outlet positioned for discharging effluent back into said first recirculation chamber; and means for operating said impeller structure.

2. In a water treating apparatus, a receptacle, the upper portion of said receptacle comprising a treated water collection zone and the portion beneath said upper portion including a settling zone wherein foreign material is precipitated from the water; said receptacle having an outlet for treated water communicating with said treated water collection zone; partitions within said receptacle forming a mixing chamber, first and second recirculation chambers, and communicating means for the flow of effluent from said mixing chamber through said first and second recirculation chambers to said settling zone; means for admitting raw water to said mixing chamber; means for admitting chemicals to said mixing chamber, means for admitting slurry to said mixing chamber; an impeller structure having first, second, and third pumping sections, said pumping sections being concentrically disposed about and driven by a common driving shaft; said first pumping section having its inlet positioned at the outlet of said mixing chamber to receive therefrom effluent comprising water, chemicals, and slurry, said first pumping section discharging effluent into said first recirculation chamber; said second pumping section having its inlet positioned to receive effluent from said first recirculation chamber and its outlet positioned for discharging effluent into said second recirculation chamber, means for guiding part of the discharge from said second pumping section into said settling zone; said third pumping section having its inlet positioned to receive effluent from said second recirculation chamber and its outlet positioned for discharging effluent back into said first recirculation chamber; and means for operating said impeller structure.

3. In a water treating apparatus, a receptacle, the upper portion of said receptacle comprising a treated water collection zone, and the portion beneath said upper portion including a settling zone wherein foreign material is precipitated from the water; said receptacle having an outlet for treated water communicating with said treated water collection zone; partitions within said receptacle forming a mixing chamber, first and second recirculation chambers, and communicating means for the flow of effluent from said mixing chamber through said first and second recirculation chambers to said settling zone; means for admitting raw water to said mixing chamber; means for admitting chemicals to said mixing chamber; means for admitting slurry to said mixing chamber; an impeller structure having first, second and third pumping sections; said pumping sections being of annular form and having a plurality of flow directing vanes; said first pumping section having its inlet positioned at the outlet of said mixing chamber to receive therefrom effluent comprising water, chemicals, and slurry, said first pumping section discharging effluent into said first recirculation chamber; said second pumping section having its inlet positioned to receive effluent from said first recirculation chamber and its outlet positioned for discharging effluent into said second recirculation chamber and said settling zone; said third pumping section having its inlet positioned to receive effluent from said second recirculation chamber and its outlet positioned for discharging effluent back into said first recirculation chamber; and means for operating said impeller structure.

4. In a water treating apparatus, a receptacle, the upper portion of said receptacle comprising a treated water collection zone and the portion beneath said upper portion including a settling zone wherein foreign material is precipitated from the water; said receptacle having an outlet for treated water communicating with said treated water collection zone; partitions within said receptacle forming a mixing chamber, first and second recirculation chambers, and communicating means for the flow of effluent from said mixing chamber through said first and second recirculation chambers to said settling zone; means for admitting raw water to said mixing chamber; means for admitting chemicals to said mixing chamber; means for admitting slurry to said mixing chamber; and impeller structure having first, second, and third pumping sections; said pumping sections acting in substantially the same plane; said first and third pumping sections producing flow of the effluent in a direction substantially reverse to the direction of flow produced by said second pumping section; said first pumping section having its inlet positioned at the outlet of said mixing chamber to receive therefrom effluent comprising water, chemicals, and slurry, said first pumping section discharging effluent into said first recirculation chamber; said second pumping section having its inlet positioned to receive effluent from said first recirculation chamber and its outlet positioned for discharging effluent into said second recirculation chamber, means for guiding part of the discharge from said second pumping section into said settling zone; said third pumping section having its inlet positioned to receive effluent from said second recirculation chamber and its outlet positioned for discharging effluent back into said first recirculation chamber; and means for operating said impeller structure.

5. In a water treating apparatus, a receptacle, the upper portion of said receptacle comprising a treated water collection zone and the portion beneath said upper portion including a settling zone wherein foreign material is precipitated from the water; said receptacle having an outlet for treated water communicating with said treated water collection zone; partitions within said receptacle forming a mixing chamber, first and second recirculation chambers, and communicating means for the flow of effluent from said mixing chamber through said first and second recirculation chambers to said settling zone; means for admitting raw water to said mixing chamber; means for admitting chemicals to said mixing chamber; means for admitting slurry to said mixing chamber; an impeller structure having first, second, and third pumping sections; said first pumping section having its inlet positioned at the outlet of said mixing chamber to receive therefrom effluent comprising water, chemicals, and slurry, said first pumping section discharging effluent into said first recirculation chamber; said second pumping section having its inlet positioned to receive effluent from said first recirculation chamber and its outlet positioned for discharging effluent into said second recirculation chamber, means for guiding part of the discharge from said second pumping section into said settling zone; said third pumping section having its inlet positioned to receive effluent from said second recirculation chamber and its outlet positioned for discharging effluent back into said first recirculation chamber; and means for operating said impeller structure.

6. In a water treating apparatus, a receptacle, the upper portion of said receptacle comprising a treated water collection zone and the portion beneath said upper portion including a settling zone wherein foreign material is precipitated from the water; said receptacle having an outlet for treated water communicating with said treated water collection zone; an impeller structure having first, second, and third pumping sections; said pumping sections being concentrically disposed about and driven by a common driving shaft; means for delivering water to the inlet of said first pumping section; means for delivering chemicals to the inlet of said first pumping section; means for delivering slurry to the inlet of said first pumping section; means for directing effluent discharged by said first pumping section to the inlet of said second pumping section; means for directing a portion of the effluent discharged by said second pumping section to the inlet of said third pumping section, means for directing the remainder of the effluent discharged by said second pumping section to said settling zone; means for directing the effluent discharged by said third pumping section back to the inlet of said second pumping section; and means for operating said impeller structure.

7. In a water treating apparatus, a receptacle, the upper portion of said receptacle comprising a treated water collection zone, and the portion beneath said upper portion including a settling zone wherein foreign material is precipitated from the water; said receptacle having an outlet for treated water communicating with said treated water collection zone; an impeller structure having first, second, and third pumping sections; said first and third pumping sections producing flow of the effluent in a direction substantially reverse to the direction of flow produced by said second pumping section; means for delivering water to the inlet of said first pumping section; means for delivering chemicals to the inlet of said first pumping section; means for delivering slurry to the inlet of said first pumping section; means for directing effluent discharged by said first pumping section to the inlet of said second pumping section; means for directing a portion of the effluent discharged by said second pumping section to the inlet of said third pumping section, means for directing the remainder of the effluent discharged by said second pumping section to said settling zone; means for directing the effluent discharged by said third pumping section back to the inlet of said second pumping section; and means for operating said impeller structure.

8. In a water treating apparatus, a receptacle, the upper portion of said receptacle comprising a treated water collection zone and the portion beneath said upper portion including a settling zone wherein foreign material is precipitated from the water; said receptacle having an outlet for treated water communicating with said treated water collection zone; an impeller structure having first, second and third pumping sections; means for delivering water to the inlet of said first pumping section; means for delivering chemicals to the inlet of said first pumping section; means for delivering slurry to the inlet of said first pumping section; means for directing a portion of the effluent discharged by said second pumping section to the inlet of said third pumping section, means for directing the remainder of the effluent discharged by said second pumping section to said settling zone; means for directing the effluent discharged by said third pumping section back to the inlet of said second pumping section; and means for operating said impeller structure.

9. In a water treating apparatus, a receptacle, the upper portion of said receptacle comprising a treated water collection zone and the portion beneath said upper portion including a settling zone wherein foreign material is precipitated from the water; said receptacle having an outlet for treated water communicating with said treated water collection zone; partitions within said receptacle forming a mixing chamber, first and second recirculation chambers, and communicating means for the flow of effluent from said mixing chamber to said settling zone; means for admitting raw water to said mixing chamber; means for admitting chemicals to said mixing chamber; means for admitting slurry to said mixing chamber; an impeller structure positioned to receive effluent, comprising water, chemicals, and slurry from said mixing chamber, recirculate it through said first and second recirculation chambers, and discharge it into said settling zone; and means for operating said impeller structure.

10. In a water treating apparatus, a receptacle, the upper portion of said receptacle comprising a treated water collection zone and the portion beneath said upper portion including a settling zone wherein foreign material is precipitated from the water; said receptacle having an outlet for treated water communicating with said treated water collection zone; partitions within said receptacle forming a mixing chamber, first and second recirculation chambers, and communicating means for the flow of effluent from said mixing chamber to said settling zone; means for admitting raw water to said mixing chamber; means for admitting chemicals to said mixing chamber; means for admitting slurry to said mixing chamber, mechanical means for pumping the effluent, comprising water, chemicals, and slurry, from said mixing chamber through said first and second recirculation chambers into said settling zone; said communicating means including a sinuous annular passage in the path of the effluent pumped by said mechanical means into said settling zone; said annular passage having a plurality of fixed flow directing vanes for imparting rotary motion to the effluent entering said settling zone.

11. In a water treating apparatus, a receptacle, the upper portion of said receptacle comprising a treated water collection zone, and the portion beneath said upper portion including a settling zone wherein foreign material is precipitated from the water; said receptacle having an outlet for treated water communicating with said treated water collection zone; partitions within said receptacle forming a mixing chamber, first and second recirculation chambers, and communicating means for the flow of effluent from said mixing chamber to said settling zone; means for admitting raw water to said mixing chamber; means for admitting chemicals to said mixing chamber; means for admitting slurry to said mixing chamber; an impeller structure positioned to receive effluent, comprising water, chemicals, and slurry, from said mixing chamber, recirculate it through said first and second recirculation chambers, and discharge it into said settling zone; means for operating said impeller structure; and means for imparting rotary motion to the effluent entering said settling zone.

12. In a water treating apparatus, a receptacle, the upper portion of said receptacle comprising a treated water collection zone, and the portion beneath said upper portion including a settling zone wherein foreign material is precipitated from the water; said receptacle having an outlet for treated water communicating with said treated water collection zone; partitions within said receptacle forming a mixing chamber, first and second recirculation chambers, and communicating means for the flow of effluent from said mixing chamber to said settling zone, means for admitting raw water to said mixing chamber; means for admitting chemicals to said mixing chamber; means for admitting slurry to said mixing chamber; a rotary impeller structure positioned to receive effluent, comprising water, chemicals, and slurry, from said mixing chamber, recirculate it through said first and second recirculation chambers, and discharge it into said settling zone; means for rotating said impeller structure; and means for varying the speed of rotation of said impeller structure so as to vary the rate of recirculation of effluent through said first and second recirculation chambers.

13. In a water treating apparatus, a receptacle, the upper portion of said receptacle comprising a treated water collection zone and the portion beneath said upper portion including a settling zone wherein foreign material is precipitated from the water; a treated water storage compartment having an outlet for treated water communicating with said treated water collection zone; partitions within said receptacle forming a mixing chamber, first and second recirculation chambers, and communicating means for the flow of effluent from said mixing chamber through said first and second recirculation chambers to said settling zone; means for admitting water to said mixing chamber; means for admitting chemicals to said mixing chamber; means for admitting slurry to said mixing chamber; an impeller structure positioned to receive the effluent, comprising water, chemicals, and slurry from said mixing chamber, recirculate it through said first and second recirculation chambers and discharge it into said settling zone; means for operating said impeller structure; means for recirculating treated water from said treated water collection zone back through said mixing chamber; means reversely actuated by variations in the level of treated water in said storage compartment for regulating in complementary amounts the raw water and treated water admitted to said mixing chamber so as to maintain a substantially constant flow of water through the mixing chamber.

14. In a water treating apparatus, a receptacle, the upper portion of said receptacle comprising a treated water collection zone and the portion beneath said upper portion including a settling zone wherein foreign material is precipitated from the water; a treated water storage compartment having an outlet for treated water communicating with said treated water collection zone; partitions within said receptacle forming a mixing chamber, first and second recirculation chambers, and communicating means for the flow of effluent from said mixing chamber through said first and second recirculation chambers to said settling zone; means for admitting water to said mixing chamber; means for admitting chemicals to said mixing chamber; means for admitting slurry to said mixing chamber; an impeller structure positioned to receive the effluent, comprising water, chemicals and slurry from said mixing chamber, recirculate it through said first and second recirculation chambers and discharge it into said settling zone; means for operating said impeller structure; means for varying the rate of recirculation of effluent through said first and second recirculation chambers; means for recirculating treated water from said treated water collection zone back through said mixing chamber; means reversely actuated by variations in the level of treated water in said storage compartment for regulating in complementary amounts the raw water and treated water admitted to said mixing chamber so as to maintain a substantially constant flow of water through the mixing chamber; and means for manually regulating the amount of water recirculated.

15. In water treating apparatus, a receptacle, the upper portion of said receptacle comprising a treated water collection zone and the portion beneath said water collection zone including a settling zone wherein foreign material is precipitated from the water, said receptacle having an outlet for treated water communicating with said treated water collection zone, partitions within said receptacle forming a mixing chamber, first and second recirculation chambers and communicating means for the flow of effluent from said mixing chamber through said first and second recirculation chambers to said settling zone, means for admitting raw water to said mixing chamber, means for admitting chemicals to said mixing chamber, means for admitting slurry to said mixing chamber, an impeller structure having first, second and third pumping sections, said pumping sections being concentrically disposed about and driven by a common driving shaft, said first pumping section having its inlet positioned at the outlet of said mixing chamber to receive therefrom a mixed effluent comprising water, chemicals and slurry, said first pumping section discharging effluent into said first recirculation chamber, said second pumping section having its inlet positioned to receive effluent from said first recirculation chamber and its outlet positioned for discharging effluent into said second recirculation chamber, said second pumping section having a greater pumping capacity than said third pumping section whereby only part of the effluent pumped by the second pumping section will be returned to said first recirculating chamber and the remaining portion of effluent pumped by said second pumping section will be delivered by said communicating means to said settling zone.

16. In water treating apparatus, a receptacle, the upper part of said receptacle forming a treated water collection zone and the portion beneath said treated water collection zone including a settling zone wherein foreign material is precipitated from the water, a water storage compartment having communication with said treated water collection zone and receiving treated water therefrom, said receptacle having an outlet for treated water communicating with said water storage compartment, an annular partition in said receptacle forming a mixing zone, a partition in said receptacle forming a recirculation zone, conduit means for delivering treated water from said treated water collection zone into said mixing chamber, means for admitting chemicals to said mixing chamber, means for admitting raw water to said mixing chamber, said annular partition provided with openings opening into said settling zone for admitting slurry into the mixing chamber, and a pump at the outlet of said mixing chamber to pump the mixture of water, slurry, and chemicals into said recirculation zone, a partition in said receptacle forming a second recirculating zone, a passageway communicating with said second recirculating zone and with said settling zone, a second pump for pumping the mixture of water and slurry from said first recirculating zone into said second recirculating zone, and a third pump for pumping the mixture from said second recirculating zone to said first recirculating zone, said second pump having a greater capacity than said third pump whereby all of the mixture pumped into the second recirculating zone from said first recirculating zone will not be returned thereto and the unreturned portion of the mixture will pass through said passageway to said settling zone.

17. In water treating apparatus, a receptacle, the upper part of said receptacle forming a treated water collection zone and the portion beneath said treated water collection zone including a settling zone wherein foreign material is precipitated from the water, a water storage compartment having communication with said treated water collection zone and receiving treated water therefrom, said receptacle having an outlet for treated water communicating with said water storage compartment, an annular partition in said receptacle forming a mixing zone, a partition in said receptacle forming a recirculation zone, conduit means for delivering treated water from said treated water collection zone into said mixing chamber, means for admitting chemicals to said mixing chamber, means for admitting raw water to said mixing chamber, said annular partition provided with openings opening into said settling zone for admitting slurry into the mixing chamber, and a pump at the outlet of said mixing chamber to pump the mixture of water, slurry, and chemicals into said recirculation zone, a partition in said receptacle forming a second recirculating zone, a passageway communicating with said second recirculating zone and with said settling zone, a second pump for pumping the mixture of water and slurry from said first recirculating zone into said second recirculating zone, and a third pump for pumping the mixture from said second recirculating zone to said first recirculating zone, said second pump having a greater capacity than said third pump whereby all of the mixture pumped into the second recirculating zone from said first recirculating zone will not be returned thereto and the unreturned portion of the mixture will pass through said passageway to said settling zone, a valve for controlling the quantity of raw water admitted into said mixing chamber, a valve for controlling the quantity of treated water admitted into said mixing chamber, pressure operated means for operating said valves, and means controlled by the level of treated water in said water storage compartment for controlling operation of said valves.

JOSEPH F. SEBALD.

REFERENCES CITED

The following references are of record in the file of this patent:

UNITED STATES PATENTS

| Number | Name | Date |
| --- | --- | --- |
| 1,030,366 | Winters | June 25, 1912 |
| 2,245,588 | Hughes | June 17, 1941 |
| 2,355,561 | Robinson | Aug. 8, 1944 |
| 2,355,564 | Sebald | Aug. 8, 1944 |
| 2,383,086 | Sebald | Aug. 21, 1945 |
| 2,391,738 | Prager | Dec. 25, 1945 |
| 2,419,004 | Bieker et al. | Apr. 15, 1947 |
| 2,425,372 | Green | Aug. 12, 1947 |
| 2,427,886 | Walker | Sept. 23, 1947 |
| 2,429,315 | Green | Oct. 21, 1947 |